United States Patent [19]

Pak et al.

[11] Patent Number: 5,352,642

[45] Date of Patent: Oct. 4, 1994

[54] FABRICATION OF $Y_3AL_5O_{12}$ FIBERS FROM WATER SOLUBLE POLYMERS

[75] Inventors: Sung S. Pak, Evington, Va.; R. Allen Kimel, Greensboro, N.C.

[73] Assignee: The Babcock & Wilcox Company, New Orleans, La.

[21] Appl. No.: 974,040

[22] Filed: Nov. 10, 1992

[51] Int. Cl.$^5$ ............................................. C04B 35/50
[52] U.S. Cl. ........................................ 501/95; 501/12; 501/86; 501/152; 501/153; 501/127; 423/263; 423/600
[58] Field of Search ................ 501/12, 86, 152, 153, 501/127, 95; 423/263, 600

[56] References Cited

U.S. PATENT DOCUMENTS

| | | | |
|---|---|---|---|
| 4,710,227 | 12/1987 | Harley et al. | 501/12 |
| 4,757,036 | 7/1988 | Kaar | 501/10 |
| 5,037,577 | 8/1991 | Yamanoi et al. | 423/600 |
| 5,196,388 | 3/1993 | Shyu | 423/600 |
| 5,217,933 | 6/1993 | Budd et al. | 501/152 |

OTHER PUBLICATIONS

T. A. Parthasarathy, T-I Mah, K. Keller, "Creep Mechanism of Polycrystalline Yttrium Aluminum Garnet", J. Am. Cer. Soc. 75(7) 1756–9 Jul. 1992.
*High Performance Synthetic Fibers for Composites*, Publ. NMAB-458 National Academy Press, Wash. D.C., 1992.
T. F. Cooke, "Inorganic Fibers–A Literature Review", J. Am. Cer. Soc., 74(12) 2959–78 (1991).
P. Colomban, "Gel Technology in Ceramics, Glass-Ceramics, and Ceramic-Ceramic Composites", Ceram. Inter., 15 pp. 23–50 (1989).
R. Roy, "Ceramics by the Solution-Sol-Gel Route", Science, 238, pp. 1664–1670 (1987).
B. E. Yoldas, "Preparation of Glasses and Ceramics from Metal-Organic Compounds", J. Mater. Sci. 12 pp. 1203–1208 (1977).
K. S. Mazdiyasni, "Powder Synthesis from Metal-Organic Precursors", Ceram. Inter., 8, pp. 42–56, 1982.
P. E. D. Morgan, "Innovative Chemical/Ceramic Directions", Mater. Res. Soc. Symp. Proc., 73, (1986) pp. 751–763.
H. Okamura and H. K. Bowen, "Preparation of Alkoxides for the Synthesis of Ceramics", Ceram. Inter. 12, (1986) pp. 161–171.
Y. Nomiya, "Present State and Future Prospects for the Colloid Process for Fine Ceramics", J. Cer. Soc. Jpn., Intern. Ed. 97 (1987) R21–R29.

*Primary Examiner*—Karl Group
*Assistant Examiner*—C. M. Bonner
*Attorney, Agent, or Firm*—Daniel S. Kalka; Robert J. Edwards

[57] ABSTRACT

A method for fabricating $Y_3Al_5O_{12}$ (YAG) fibers from water soluble polymers includes a pre-YAG polymer synthesis, with solution viscosity adjustment followed by fiber spinning and heat treatment. The polymer synthesis employs polar solvents such as water or alcohol with a carboxylic acid containing at least two carboxyl groups.

18 Claims, 10 Drawing Sheets

As Drawn

FABRICATION OF $Y_3AL_5O_{12}$ FIBERS FROM WATER SOLUBLE POLYMERS

BACKGROUND OF THE INVENTION

1. Field of the Invention

The present invention relates generally to a process for fabricating ceramic fibers from water-soluble polymers, and more particularly to a process for fabricating strong, creep resistant $Y_3Al_5O_{12}$ fibers.

2. Description of the Related Art

Since the development of E-glass fibers in the 1920's and their successful exploitation as reinforcements for metals and polymers in 1940's, a number of ceramic fibers have entered the composites market. The high modulus, specific strength, and thermo-oxidative resistance of these fibers have allowed the replacement of traditional monolithic components with composite parts of superior strength, reliability and fuel efficiency.

Ceramic fibers are manufactured by either the polymer or the colloidal methods. In the former, a thermoplastic inorganic polymer solution of suitable viscosity is spun and pyrolytically decomposed. Nicalon, a registered trademark of Nippon Carbon, and HPZ, a registered trademark of Dow Corning, are two commercially available fibers produced by this method.

In the colloidal method, a sol consisting of ultrafine ceramic particles and fugitive organic additives is spun and sintered. A number of commercially available fibers are produced with this method including PRD 166, a registered trademark of DuPont, and Almax, a registered trademark of Mitsui Mining Co.

Figure 1:
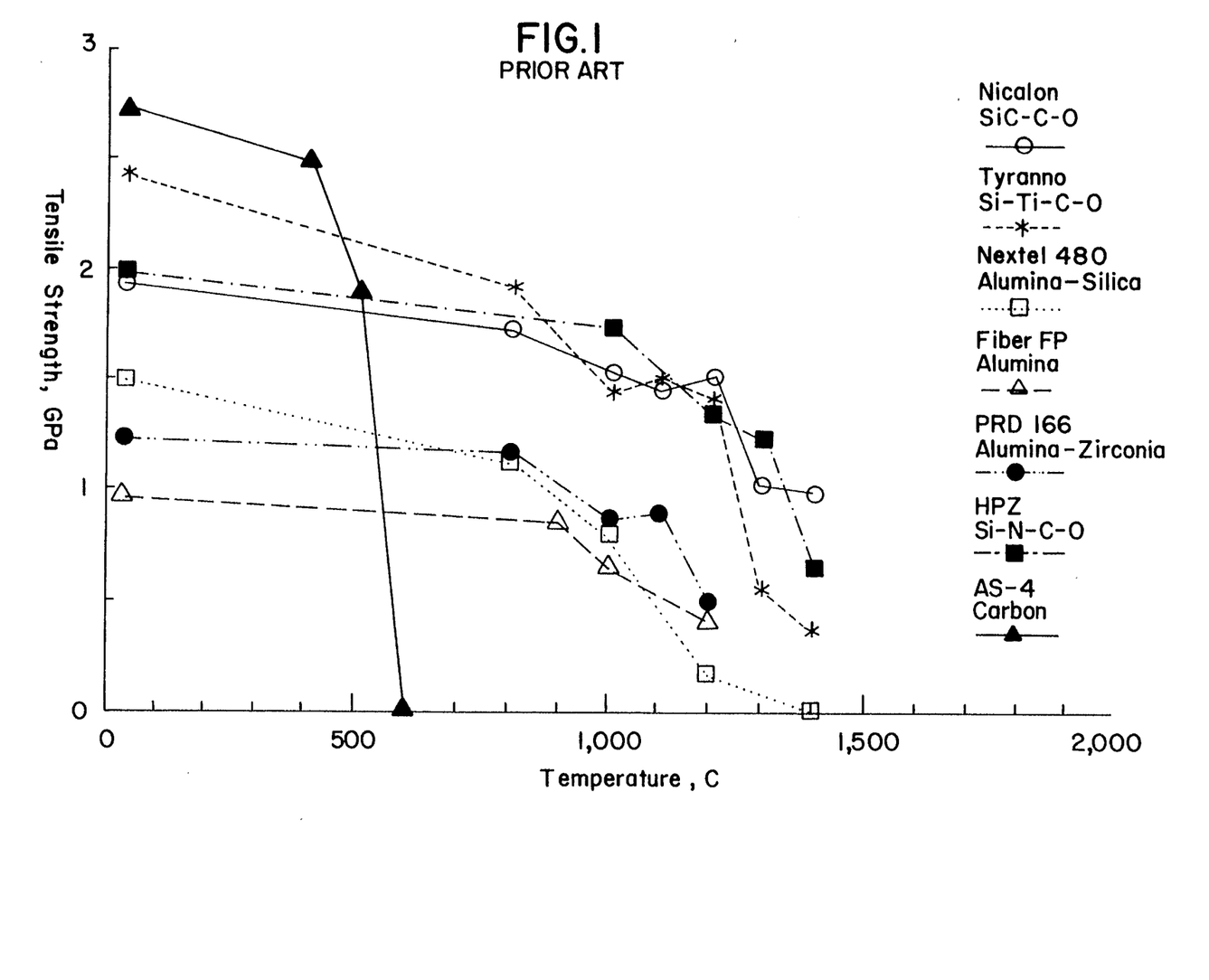
FIG. 1 is a graph plotting tensile strengths of several commercial fibers versus temperature.

Despite the success of ceramic fibers, none of the commercially available fibers can bear load at temperatures exceeding 1100° C. in an oxidizing atmosphere, as evidenced by the data shown in FIG. 1. All the fibers were tested in air. It is clear that a new class of fibers must be developed for high temperature applications such as in advanced high temperature gas turbine engines, in which service temperatures in excess of 1300° C. are foreseen.

The National Materials Advisory Board's Commission on Engineering and Technical Systems of the National Research Council recently stated that a review of the properties of the oxide ceramic fibers that are available at the present time discloses that they cannot meet many of the projected requirements for reinforcement of high-temperature composites requiring stable strength and stiffness properties and resistance to creep at high temperatures (e.g.>1200° C.), for extended periods of time. New fibers of selected compositions will be necessary to satisfy these needs.

Recent examinations of high temperature materials point to $Y_3Al_5O_{12}$ (yttrium aluminate garnet) hereinafter referred to as YAG fibers as the best qualified material. Currently, both the polymer and colloidal methods previously discussed are being actively pursued to synthesize YAG fibers. For example, at least one company is pursuing a polymer route, while another a colloidal route.

Figure 2:
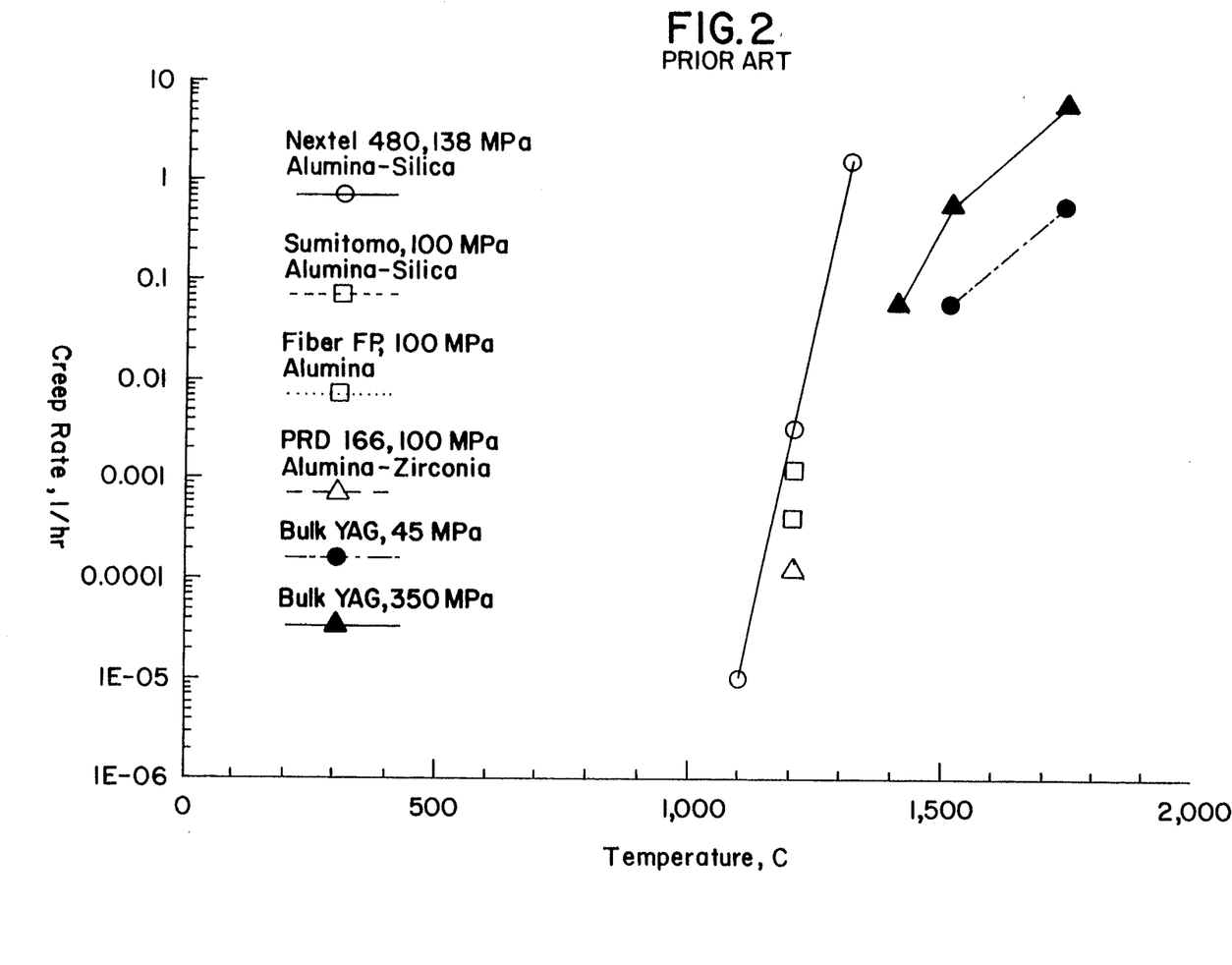
FIG. 2 is a plot of creep rate of several commercial fibers versus temperature. Polycrystalline YAG data are included for comparison.

FIG. 2 shows the excellent creep resistant properties of YAG compared to commercial fibers of conventional ceramic materials. Alumina fibers exhibit good creep resistance, but are not as corrosion resistant as evidenced by the data in Table 1. Table 1 compares these two types of fibers in both lithium (Li) and sodium (Na) environments.

TABLE 1

|    |          | $Al_2O_3$ | $Y_3Al_5O_{12}$ |
|----|----------|-----------|-----------------|
| Li | 375° C.  | 12 mm/yr  | 0.016 mm/yr     |
| Na | 1000° C. | Severe    | 0.788 mm/yr     |

Consequently, there is a need to develop an economical and commercially feasible process for fabricating YAG fibers including a fiber spinning technique therefor.

SUMMARY OF THE INVENTION

The present invention solves the aforementioned problems with the prior art as well as others by providing an economically feasible method for making an yttrium-aluminum water soluble polymer and a method for fabricating YAG fibers therefrom.

The method of the present invention mixes an yttrium salt with an aluminum salt in an yttrium to aluminum molar ratio of about 3 to 5. The yttrium and aluminum salt mixture is added to a polar solvent and an acid having at least two carboxyl groups. This solution is refluxed for a predetermined time to form the yttrium-aluminum water soluble polymer. After the water soluble polymer is formed, its concentration is adjusted to provide an oxide char yield of at least 20% and up to 60% on a weight percent basis and a viscosity of at least $10^5$ centipoise at 65° C. Alternately, a suitable viscosity is at least $10^6$ centipoise at room temperature. YAG fibers are fabricated from this water soluble polymer. Complete pyrolysis of the YAG polymer fibers is achieved by heating the fibers in air at a predetermined temperature.

Accordingly, an object of the present invention is to provide a method for making an yttrium-aluminum water soluble polymer.

Another object of the present invention is to provide a method for fabricating YAG fibers from the water soluble polymer.

Still another object of the present invention is to provide an economically feasible process for fabricating strong, creep resistant YAG fibers.

Still a further object of the present invention is to provide a method which employs solvents that are readily available and inexpensive instead of the hazardous organic solvents of the prior art methods which require expensive recycling and waste disposal processes.

The various features of novelty which characterize the present invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

The present invention resides in an economically feasible process for fabricating strong, creep resistant YAG fibers. Basically, the process comprises four steps which include pre-YAG polymer synthesis; solution viscosity adjustment; fiber spinning; and heat treatment.

Each of these steps are discussed in greater detail with an example being given.

Yttrium (Y) and aluminum (Al) salts such as nitrates, chlorides and acetates, are weighed and mixed in the Y to Al molar ratio of about 3:5. This salt mixture is added to a polar solvent containing a multifunctional carboxylic acid. Suitable polar solvents include water or short chain alcohols like methanol, ethanol and isopropanol. It is envisionable that other polar solvents with a similar polarity index to the aforementioned solvents would also be suitable. A suitable multifunctional carboxylic acid preferably contains at least two carboxyl groups, for example oxalic, tartaric, and citric acids. The ratio of the total number of carboxyl groups to that of metal functional groups must be maintained between about 0.1 to about 0.6. The above solution is refluxed for approximately 24 hours to allow polymerization among Y, Al, and the carboxylic acid. The solution is then evaporated until a predetermined amount of the ligands are expelled and a viscoelastic polymer solution is obtained.

Figure 4:
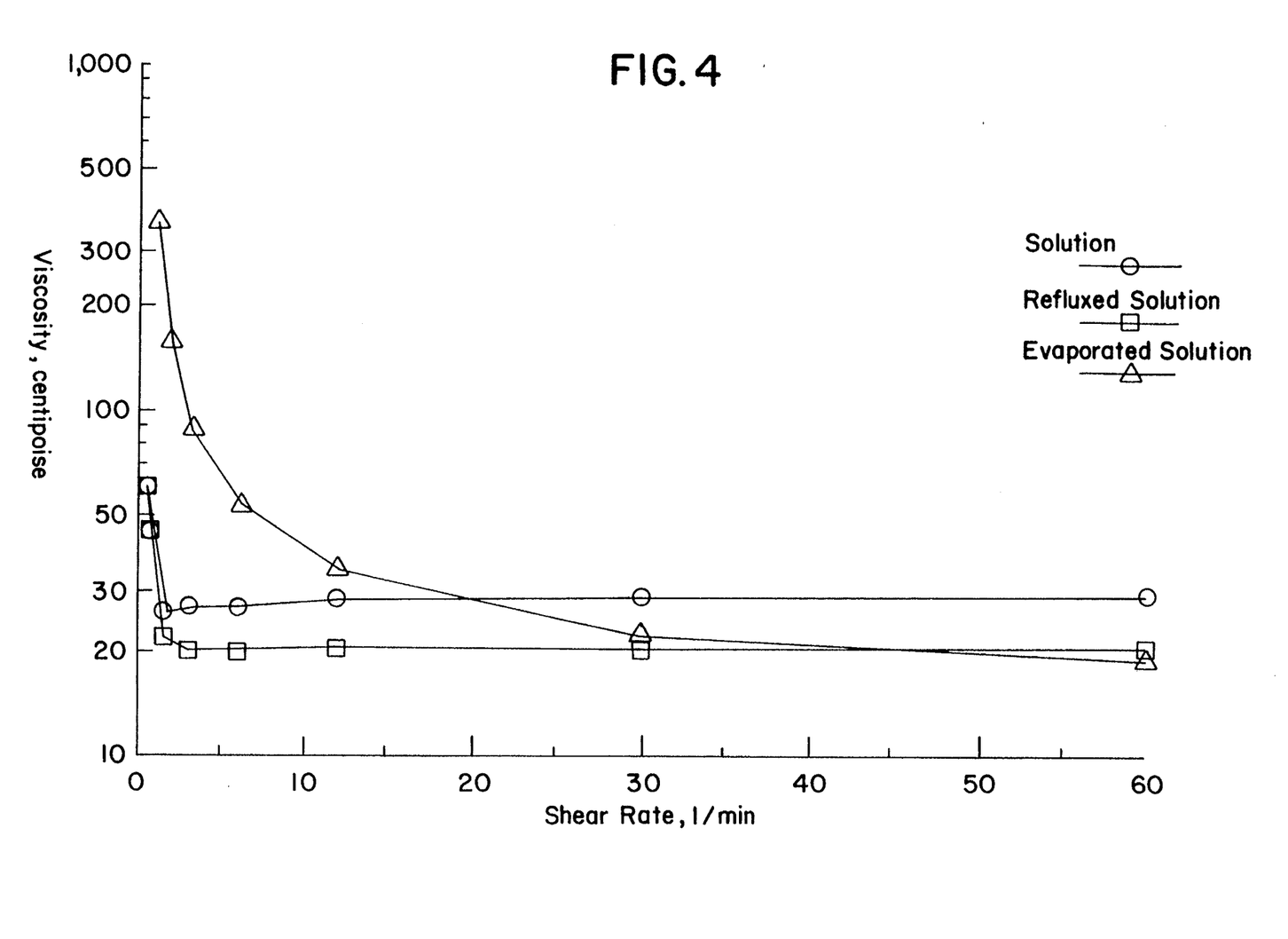
FIG. 4 is a graph showing the changes in viscosity as a function of shear rate during the course of pre-YAG polymer synthesis with the method of the present invention.
Figure 5:
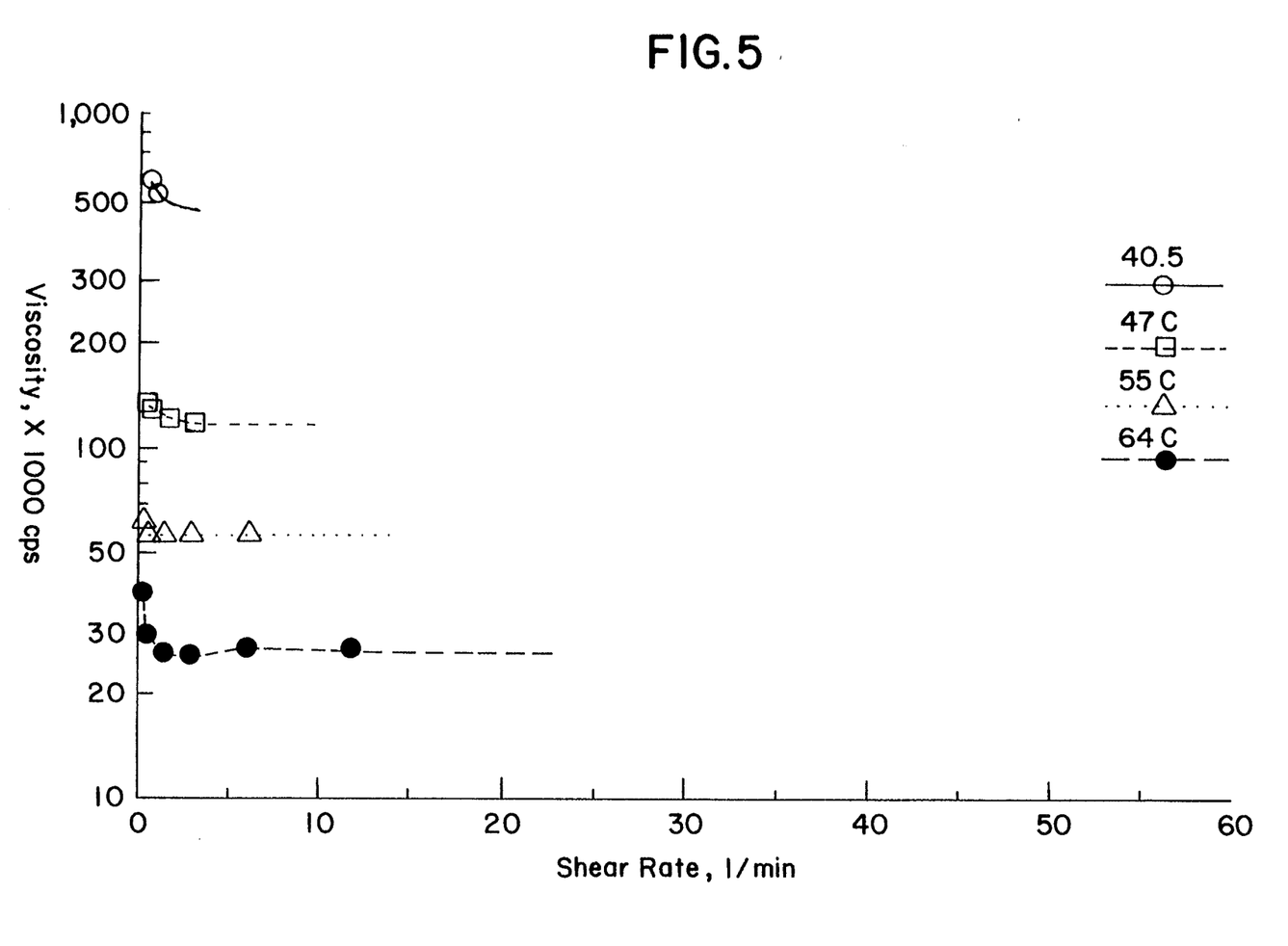
FIG. 5 is a plot of viscosity versus shear rate at 4 different temperatures.

The concentration of the polymer solution is adjusted so that the oxide char yield is at least 20% on a weight percent basis and the room temperature viscosity is at least $10^6$ centipoise (cps). The solution is heated to 65° C. at which point the viscosity is decreased to $10^5$ centipoise and is suitable for fiber drawing. FIG. 4 shows the viscosity versus shear rate of the pre-YAG polymer as a solution, refluxed solutions, and evaporated or concentrated solution. The drastic improvement in viscoelasticity after evaporation is an indication of polymer growth. As one of ordinary skill in this art realizes, the temperature that the solution is heated may vary for the purpose of adjusting the viscosity so that suitable fibers can be drawn. The effect of temperature on viscosity is shown in FIG. 5.

Figure 8:
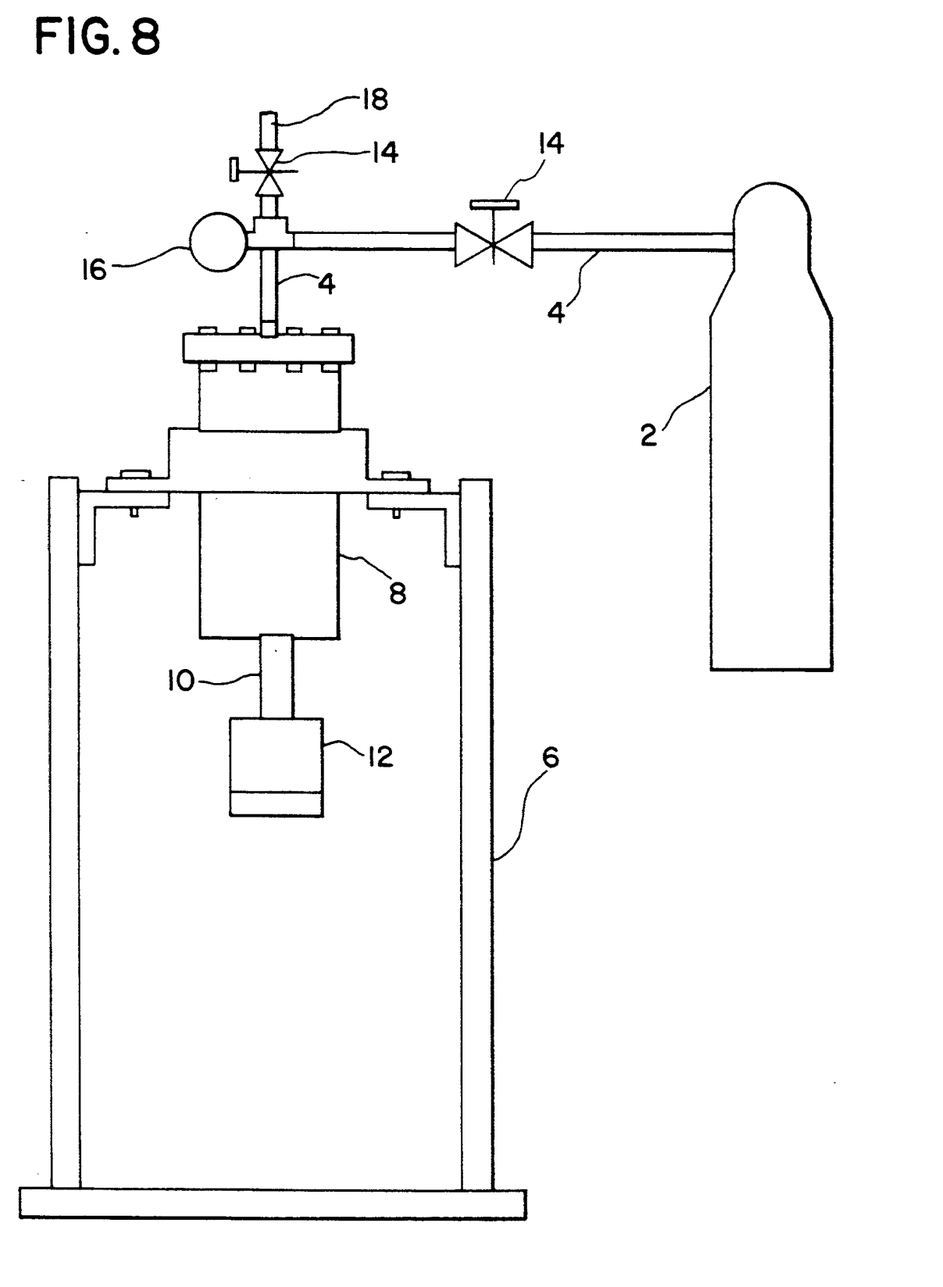
FIG. 8 is a cross-sectional view of one embodiment of fabricating the YAG fibers.

Thin (20–100 micron in diameter) YAG fibers of approximately 10–100 centimeters in length are easily withdrawn from the solution in any suitable fashion. One manner is by merely dipping a glass rod and drawing the rod out at a rate of approximately 2 to 20 centimeters per second so that the as-drawn fibers retain their shape and do not stick with each other. Another manner of fabricating the fibers is shown in FIG. 8.

An inert gas such as nitrogen from a gas source (2) is supplied by means of pipe (4) to a vessel (6). Vessel (6) includes a reservoir (8) containing the pre-YAG polymer. The nitrogen is employed to push the pre-polymer into a conduit (10) through a spinnerette (12) having a predetermined hole size, for example of about 50 microns, to produce YAG fibers in vessel (6) in an inert atmosphere. Valves (14) and regulators (16) can be employed for regulating and monitoring the system. A nitrogen pressure of 300 psi is required for the 50 micron hole size. Vent (18) relieves pressure from the system and removes any off-gas. Preferably, the fibers are fabricated in an inert atmosphere such as argon or nitrogen to keep the fibers from atmospheric moisture since they are hygroscopic.

Figure 10:
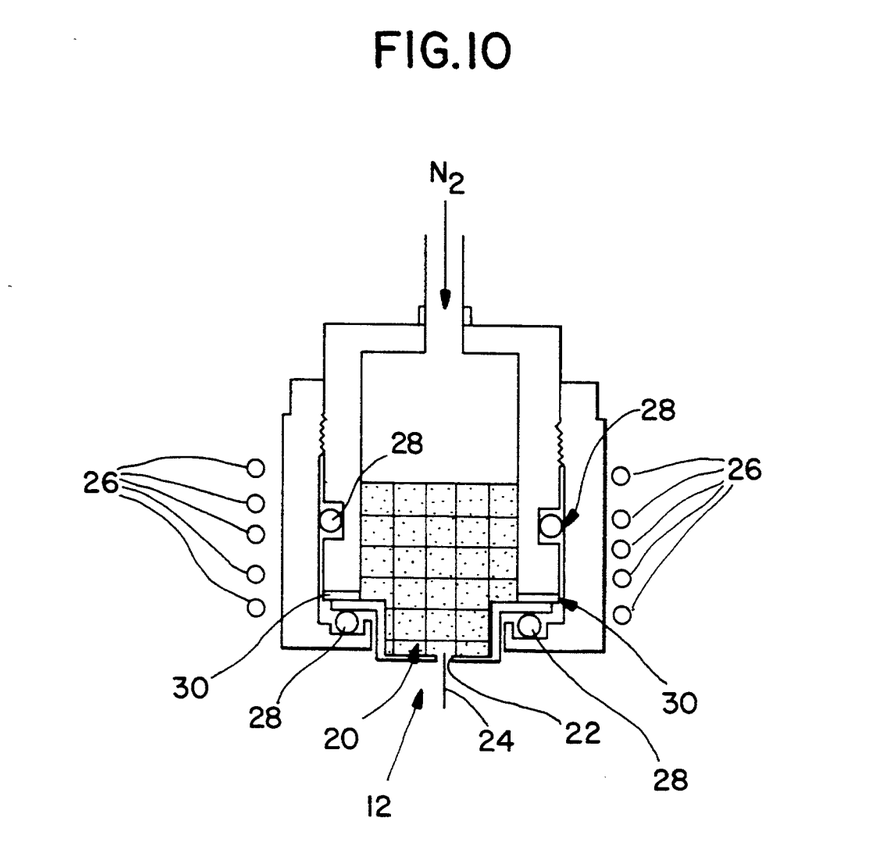
FIG. 10 is a sectional view showing the details of the spinnerette.

FIG. 10 is a sectional view of the details of a spinnerette. In FIG. 10, nitrogen shown by the arrow and supplied by a source (not shown) enters the spinnerette (12) at a predetermined pressure. The pre-YAG polymer (20) in the spinnerette (12) is forced through a small opening (22) which produces the fiber (24). A heating coil (26) maintains the pre-YAG polymer at the proper viscosity. O-rings (28) and teflon bushings (30) are employed for sealing the unit.

Finally, complete pyrolysis of the pre-YAG polymer fibers is achieved by heating the fibers in air from room temperature to about 500° C. at about 1° C./min. Full densification is achieved by further heating at about 10° C./min. to about 875° C. and holding for approximately 30 minutes. Crystallization to the ceramic state from an amorphous state occurs by heating from about 875° C. to about 1000° C. at the rate of about 10° C./min.

Figure 3:
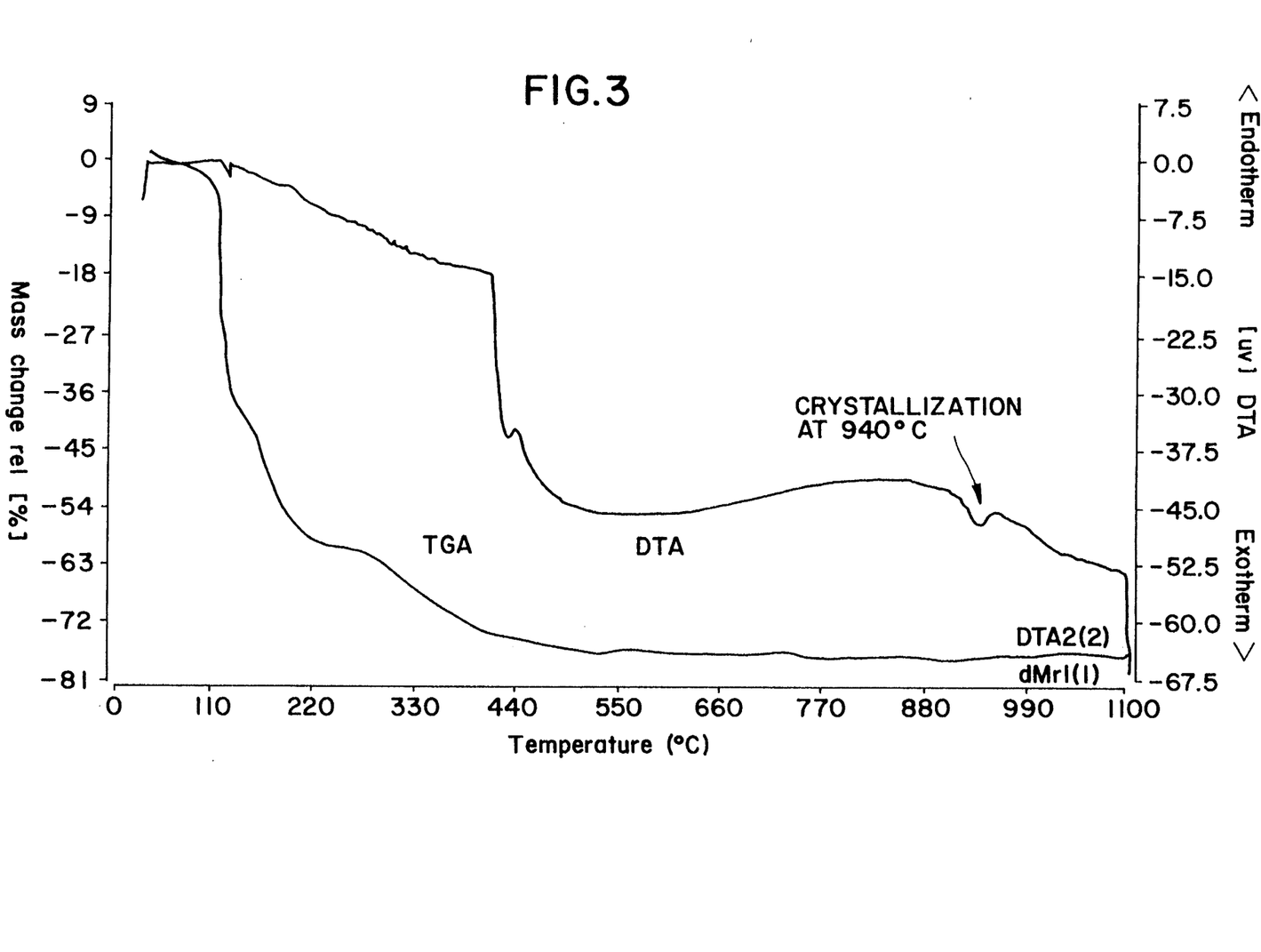
FIG. 3 shows Differential Thermal Analysis (DTA) and Thermogravimetric Analysis (TGA) scans of a pre-YAG polymer produced in accordance with the present invention. The exotherm at 940° C. indicates the crystallization of YAG.
Figure 6:
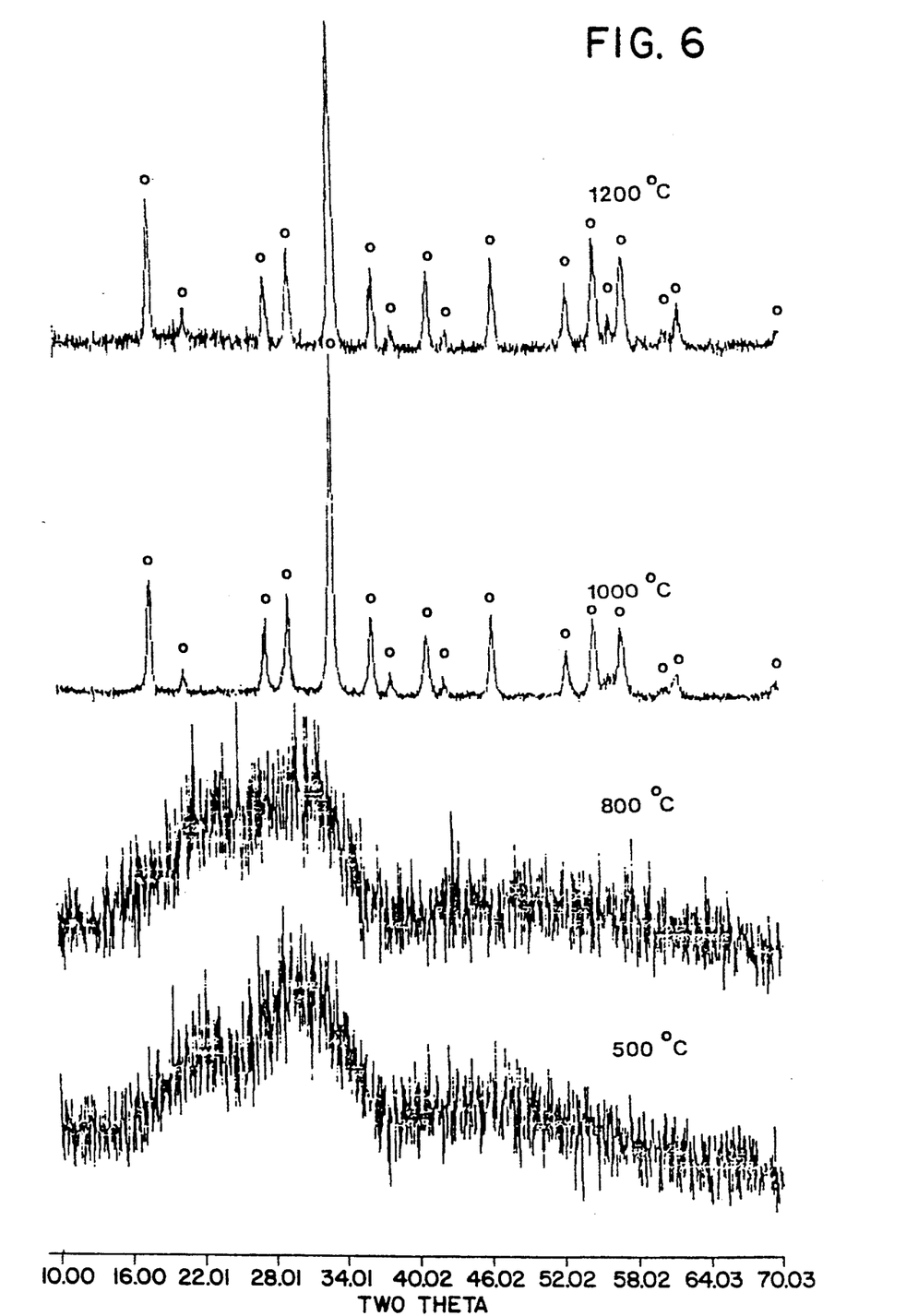
FIG. 6 shows x-ray diffraction spectra at different temperatures. The intensity of diffracted x-rays is plotted against two theta, which is the angle between the reflected and transmitted x-rays. The spectra reveal that the DTA endotherm at 940° C. is due to the crystallization of amorphous polymer to cubic YAG.

FIG. 6 shows the x-ray diffraction spectra (XRD) of the pre-polymer after the foregoing the treatments at an instrument setting of two theta. The spectra at 800° C. and 500° C. indicate the amorphous polymer. The spectra at 1000° C. and 1200° C. show the crystalline ceramic state. A comparison to the JCPDS standard (#33–40) indicates that the fiber consists of cubic YAG crystals and no impurities are present. The inflection in the curve in FIG. 3 indicates crystallization occurs at 940° C. and confirms the XRD spectra.

Figure 7A:
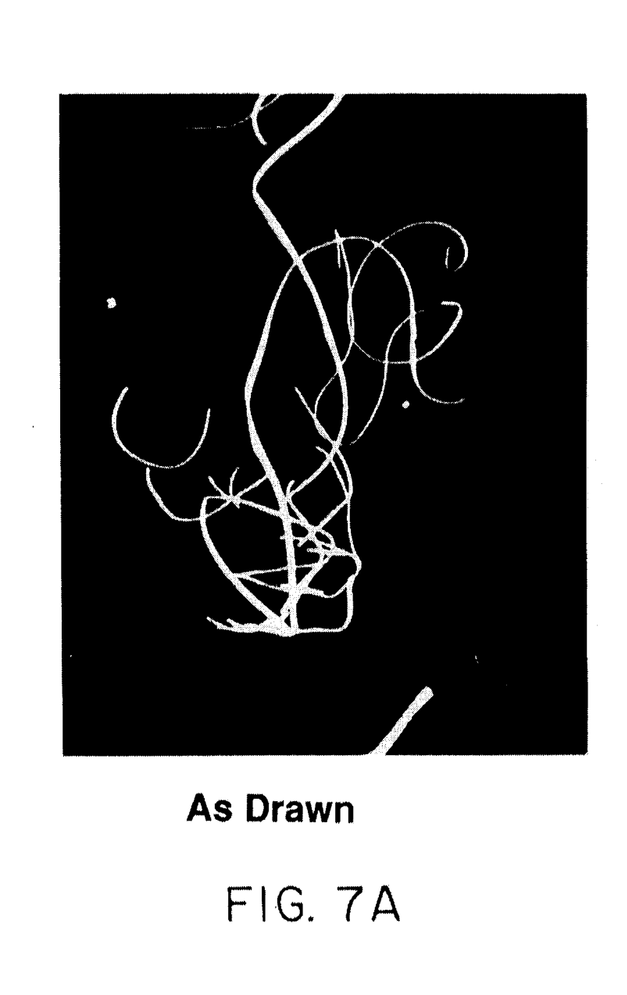
FIG. 7(a) shows an optical micrograph of as-drawn fibers.
Figure 7B:
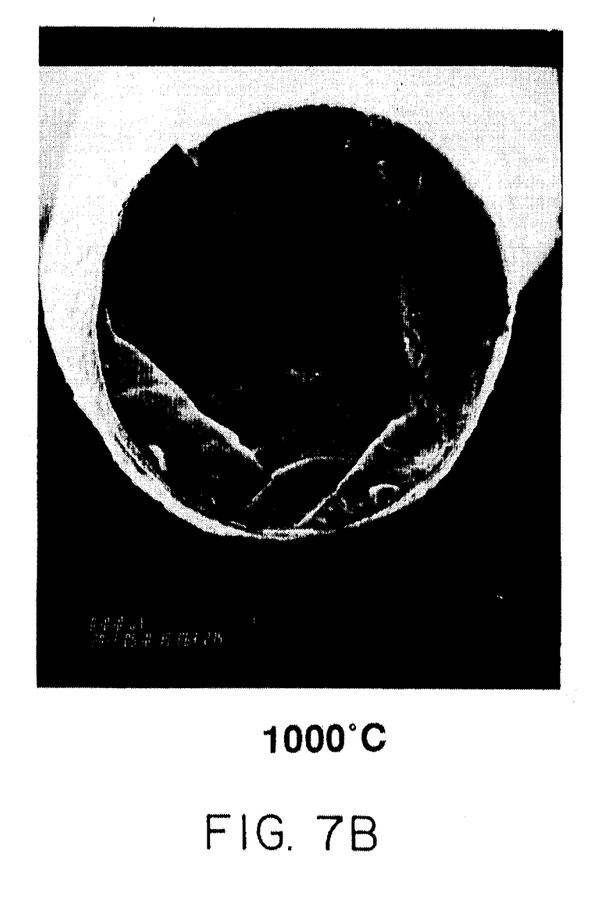
FIG. 7(b) shows a Secondary Electron Microscope (SEM) image of the same fiber heat treated at 1000° C.

FIG. 7 shows the morphology of as-drawn fibers. The fibers are long and flexible. After a heat treatment at 1000° C., 20 micron diameter fibers are obtained.

EXAMPLE 1

2.298 g of $Y(NO_3)_3 6H_2O$, 3.752 g of $Al(NO_3)_3 9H_2O$, 0.429 g of oxalic acid ($HO_2CCO_2H\ 2H_2O$), and 9.108 g of methanol are mixed in a 100 ml round-bottom flask. The solution is thoroughly mixed by stirring and then heated at 70° C. After a significant amount of yellow vapor is expelled, the heat is turned down to 60° C. and further evaporation is allowed to occur until the solution weight is 63.04% of the starting solids weight.

Fibers up to 1 meter in length can be drawn by dipping a glass rod and pulling at a rate between 0.5 and 50 cm/sec.

Thus formed fibers exhibit a uniform diameter of approximately 40 micrometers throughout their lengths. The as-drawn fibers are, however, hygroscopic. Moisture from air can condense on fiber surfaces and dissolve the fiber. The dissolution in atmospheric moisture can be avoided by storing the fibers on a ceramic plate and maintaining its surface temperature at 45°–50° C.

The fibers are pyrolyzed, densified, and crystallized to cubic YAG by heating from room temperature to 875° C. at 1° C./min, holding at that temperature for 1 hr, ramping up to 1000° C. at 10° C./min, and finally holding at 1000° C. for 1 hr. The fibers are cooled to room temperature at 3° C./min.

EXAMPLE 2

The same preparatory procedure as in Example 1 is followed except for holding the as-drawn fiber in a zone of $NH_3$ gas. $NH_3$ reacts with the polymer and allows the formation of a rigid film on the fiber surface. The rigid film impedes the reaction of the fiber with atmospheric moisture. The fibers must remain in the $NH_3$ zone for a minimum of 1 minute for the completion of reaction.

EXAMPLE 3

The same materials and procedure as in Example 1 are utilized except for the replacement of citric acid ($H_3C_6H_5O_7 H_2O$) for oxalic acid. A typical composition consists of 1,149 g $Y(NO_3)_36H_2O$, 1,876 g $Al(NO_3)_39H_2O$, 0.512 g $H_3C_6H_5O_7 H_2O$, and 30.0 g methanol. The solution is evaporated until only 57.82% of the initial solids weight is left.

EXAMPLE 4

57.4448 g $Y(NO_3)^36H_2O$, 93.8003 g $Al(NO_3)^39H_2O$, 41.9936 g $H_3C_6H_5O_7 H_2O$, and 60.526 g $H_2O$ are mixed in a 250 ml round-bottom flask. The mixture is stirred with a magnetic stir bar until a clear, colorless solution is obtained. The solution is reacted and concentrated simultaneously by heating the solution at 85° C. Soon after the evolution of yellow gas, the heat is turned down to 60° C. and fibers are drawn by dipping a glass rod and pulling at a rate between 1 and 20 cm/sec. The storage and firing procedures are identical to those described in Example 1.

EXAMPLE 5

3.4474 g $Y(NO_3)_36H_2O$, 5.6282 g $Al(NO_3)_39H_2O$, 2.7673 g $H_3C_6H_5O_7 H_2O$, and 37.0 g $H_2O$ are mixed in a 100 ml round-bottom flask and stirred until dissolution is complete. The solution is refluxed by heating the flask at 100° C. with a heating mantle. After a duration of 24 hr, the condensing column is removed and the solution is allowed to evaporate at 85° C. The evaporation is continued until the solution viscosity becomes greater than 500,000 cps at 60° C. Fiber drawing and sintering procedures are same as described in Example 1.

EXAMPLE 6

Figure 9:
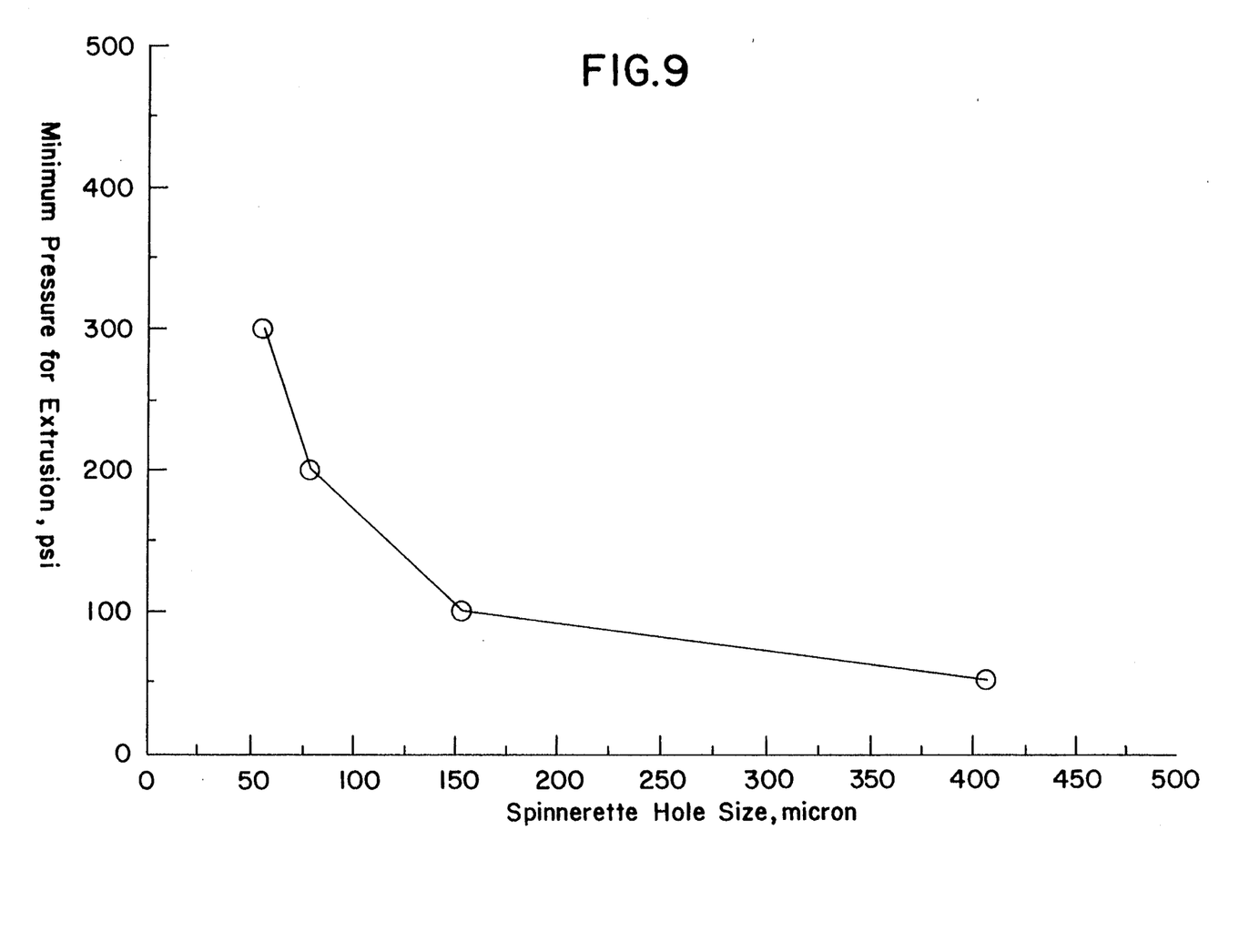
FIG. 9 is a plot of the minimum amount of nitrogen pressure required to extrude the polymer through a spinnerette of the specified hole size.

The same materials and procedures as defined in Example 5 are utilized except the fiber drawing step. Fiber drawing is performed by placing 20 ml of the concentrated polymer solution in the fiber extruder, described in FIG. 8. Fiber is formed by extruding the polymer through a spinnerette. The nitrogen pressure required for fiber formation depends on spinnerette hole size. The detailed relationship is given in FIG. 9. The storage and heat treatment procedures are identical to those described in Example 1.

EXAMPLE 7

57.4516 g of $Y(NO_3)_36H_2O$, 93.7826 of g $Al(NO_3)_39H_2O$, are dissolved in 202.1441 g of distilled water. The pH of the solution is 1.32. The solution is poured into a rapidly stirring solution containing 90 ml of 29.4% $NH_3$ and 475 ml of distilled water. The pH of the $NH_3$ solution is 12.29. Soon upon mixing, the precipitation of white particles occurs. The particles are presumed to consist of the hydroxides of Y and Al. The suspension pH is 8.90. The particles are thoroughly washed with freshly distilled water. After drying the washed powder at 110° C. for 24 hr, it is calcined at 1000° C. for 1 hr. An x-ray diffraction analysis showed that the powder consists of only crystalline YAG. The calcined powder is ground with a mortar and pestle, and then passed through a sieve with 38 micron holes.

In a separate container, 11.2074 g of $Y(NO_3)_36H_2O$, 18.2948 g of $Al(NO_3)_39H_2O$, and 8.1932 g of citric acid are dissolved in 11.7046 g of distilled water. In this solution, 10.000 g of the calcined YAG powder is added. While being thoroughly mixed with a magnetic stir bar, the mixture is heated at 85°–90° C. to allow reaction and evaporation. Thus formed mixture possesses a ceramic char yield of 60% by weight.

Fiber drawing and sintering procedures are identical to those described in Example 1.

EXAMPLE 8

57.45 g of $Y(NO_3)_36H_2O$, 93.7808 g of $Al(NO_3)_39H_2O$, and 41.9936 g of $H_3C_6H_5O_7H_2O$ are placed in a 250 ml round-bottom flask and mixed with 60.52 g of deionized water. The mixture is stirred with a magnetic stir bar until a clear, colorless solution is obtained.

Approximately 200 ml of the solution is poured into a 400 ml beaker and its viscosity as a function of shear rate is measured with a Brookfield Digital Viscometer (model #LVTDV-II). Prior to each run, the accuracy of the viscometer is checked with known standards.

After the measurement the solution is poured back into the flask and refluxed for 24 hr. After cooling the solution to room temperature, the viscosity measurement is performed again.

The solution is then heated until a copious amount of yellow vapor (presumably a form of $N_xO_y$) is expelled. The viscosity measurement is performed again.

The present invention provides the following advantages over conventional ceramic fiber spinning techniques. The present invention employs water as a solvent, instead of hazardous organic solvents which require expensive recycling and waste disposal processes. All of the precursors are readily available and thus, inexpensive.

Thermal gravimetric analysis (TGA) shows that the spinnable polymer solutions have char yields as high as 30 weight percent. Most pre-ceramic polymer solutions used in commercial practice have yields below 25% on a weight percent basis. With fine YAG powder additions, the yield can be increased as high as 60%.

In the method of the present invention, the rheology parameters, i.e., the temperature and concentration, are easily controlled. Consequently, rheology changes are easily restored to original conditions by readjusting these control parameters. Rheology reversability of such ease is impossible with metal alkoxides.

Since full densification and crystallization occur at temperatures below 1000° C., the process allows minimal chance for exaggerated grain growth and thus poor mechanical properties.

The ability of the polyfunctional carboxylic acids to form polymers with virtually all metals makes this invention applicable to most oxide ceramics. For example, $Al_2O_3$ fibers have been synthesized using the present technique. Additionally, the method of the present invention is easily modifiable to deposit thin films as well.

While a specific embodiment of the invention has been shown and described in detail to illustrate the application of the principles of the invention, it will be understood that the invention may be embodied otherwise without departing from such principles.

We claim:

1. A method for making an yttrium-aluminum water soluble polymer, comprising the steps of:
   mixing an yttrium salt with an aluminum salt in an yttrium to aluminum molar ratio of about 3 to 5;
   adding said yttrium and aluminum salt mixture to a solution containing a polar solvent and an acid having at least two carboxyl groups; and
   refluxing said yttrium and aluminum salt solution for a time to allow polymerization among the yttrium and aluminum functional groups, and carboxyl groups for forming the yttrium and aluminum water soluble polymer.

2. A method as recited in claim 1, wherein the ratio of the total number of carboxyl groups to that of the yttrium and aluminum functional groups is between about 0.1 to about 0.6.

3. A method as recited in claim 2, further comprising the step of evaporating ligands from the polymer for increasing its viscosity.

4. A method as recited in claim 1, wherein the refluxing step is performed for about twenty-four hours.

5. A method for fabricating yttrium aluminum garnet fibers, comprising the steps of:
   forming a water-soluble polymer solution from yttrium and aluminum salts mixed with a polar solvent and an acid having at least two carboxyl groups;
   heating the water-soluble polymer solution to adjust the concentration thereof to provide an oxide char yield of at least 20 percent on a weight percent basis and a viscosity of at least $10^5$ centipoise; and
   fabricating fibers from the adjusted water-soluble polymer in an inert atmosphere.

6. A method as recited in claim 5, further comprising the step of pyrolyzing the fibers fabricated from the water-soluble polymer.

7. A method as recited in claim 6, wherein the pyrolyzing step includes heating the fibers in air from room temperature to about 500° C. at about 1° C./minute.

8. A method as recited in claim 7, further comprising the step of heating the fibers at about 10° C./minute from about 500° C. to about 875° C. and holding at this temperature for about 30 minutes.

9. A method as recited in claim 5, further comprising the step of heating the fibers at about 10° C./minute from about 875° C. to about 1000° C.

10. A method as recited in claim 5, wherein the polar solvent is a member selected from the group consisting of water, methanol, ethanol and isopropanol.

11. A method as recited in claim 5, wherein the acid is a member selected from the group consisting of oxalic, tartaric, and citric acid.

12. A method as recited in claim 5, wherein the fabricating step produces fibers of approximately 10 to 100 centimeters in length.

13. A method as recited in claim 5, wherein the step of fabricating fibers includes the step of holding fibers in a zone of $NH_3$ gas for forming a film on the fiber surface.

14. A method for making yttrium aluminum garnet powder, comprising the steps of:
   mixing an yttrium salt with an aluminum salt in an yttrium to aluminum molar ratio of about 3 to 5;
   adding said yttrium and aluminum salt mixture to a solution containing $NH_3$ and distilled water at room temperature to produce a precipitate in a suspension;
   collecting and washing said precipitate;
   drying the precipitate; and
   calcining the precipitate to make yttrium aluminum garnet powder.

15. A method as recited in claim 1 further comprising the steps of adding a yttrium aluminum garnet powder to the yttrium-aluminum water soluble polymer and mixing while heating at a temperature sufficient to allow for reaction and evaporation to make an improved yttrium aluminum garnet water soluble polymer and to raise its oxide char yield to about 60 percent on a weight percent basis.

16. A method as recited in claim 1, wherein the yttrium salt and aluminum salt is a salt selected from the group consisting of nitrates, chlorides, and acetates.

17. A method as recited in claim 14, wherein the yttrium salt and aluminum salt is a salt selected from the group consisting of nitrates, chlorides, and acetates.

18. A method as recited in claim 5, wherein the yttrium salt and aluminum salt is a salt selected from the group consisting of nitrates, chlorides, and acetates.

* * * * *